United States Patent

[11] 3,602,269

[72] Inventors Hans Gott;
Josef Ritter; Klaus Ritter; Gerhard Ritter,
all of Graz, Austria
[21] Appl. No. 873,037
[22] Filed Oct. 31, 1969
[45] Patented Aug. 31, 1971
[73] Assignee EVG Entwicklungs & Verwertungs-
Gesellschaft mbH
Vinzenz Muchitsch Str. 36, Graz, Austria

[54] WIRE MESH WELDING MACHINE
10 Claims, 6 Drawing Figs.

[52] U.S. Cl. ..................................................... 140/112
[51] Int. Cl. ...................................................... B21f 27/10
[50] Field of Search ........................................... 140/112;
228/4, 44, 45, 47, 49

[56] References Cited
UNITED STATES PATENTS
3,213,898 10/1965 Grady et al. .................. 140/112

3,431,952 3/1969 Gott et al. ..................... 140/112

Primary Examiner—Granville Y. Custer, Jr.
Attorney—Ernest F. Marmorek

ABSTRACT: A wire mesh welding machine for making welded wire mesh consisting of longitudinal wires and transverse wires welded to each other at their crossing points includes a row of welding heads which are movable laterally across the path of movement of the longitudinal wires through the machine to adjust the spacing of the longitudinal wires in the mesh produced by the machine. The heads are individually movable by means of a power-driven conveying device and each of the welding heads is provided with its own coupling with an individual control by which the welding head can be either connected to the conveying device so that it is moved by the device or disconnected from the conveying device. In this way the distances by which the heads are moved by the conveying device when this is in operation can be individually controlled and hence the lateral spacing of the heads and of the longitudinal wires can be varied as required.

3,602,269

WIRE MESH WELDING MACHINE

Reference is had to the copending application by some of the instant inventors, Ser. No. 867,363, filed Sept. 12, 1969, assigned to the same assignee as the instant application.

In the operation of wire mesh welding machines, in which the longitudinal wires are welded to the transverse wires at the crossing points, it is necessary to be able to adjust the longitudinal wire spacing, that is to say the distances between the longitudinal wires, and also the transverse wire spacing so that mesh of any required size can be produced. Adjustment of the transverse wire spacing is comparatively simple. All that is necessary is to change the length of the stroke of a mechanism which advances the mesh step by step through the machine. To adjust the longitudinal wire spacing, on the other hand it is necessary to change the positions of the welding heads, which are mounted in a row extending across the machine, by shifting the individual welding heads across the machine in a direction perpendicular to the direction of advance of the wire mesh through the machine. The present invention is concerned with the problem of providing means for adjusting the individual welding heads in position across the machine in order to change the longitudinal wire spacing in the welded mesh.

In order to adjust the longitudinal wire spacing it is know to provide transverse electric feeder rails, for feeding electric current to the welding electrodes of the welding heads, the individual welding heads being mounted so that they can slide along the electric feeder rails across the machine and be locked in the desired positions. It has also been proposed to combine each individual welding head with its own electric power transformer and with its own hydraulic device for applying the welding thrust to the welding electrodes, that is to say for squeezing the crossed wires together during the welding operation. Each welding head is combined with its own thrust device to form a single structural unit, which is mounted to slide along the electric feed rail, a locking device being provided to lock the unit in the desired position on the rail. However both these known arrangements involve time consuming manual setting of the welding heads.

It is also known to mechanize the transverse adjustment movements of the welding heads. For this purpose the individual welding heads are attached, equally spaced apart, to the links of a lazy tongs arrangement extending across the machine. By extending or contracting the lazy tongs the spacing of the welding heads can be increased or decreased but they still always remain equally spaced apart. Finally it has also been proposed to attach the longitudinal wire guides to two transverse straps, at least one end of each strap being adjustable in position in the direction of the longitudinal wireguides, so as to allow the guides to be adjusted in position all at once.

However these mechanical arrangements are unsatisfactory, in that they do not allow the welding heads to be adjusted in position individually, but merely provide a proportional adjustment based on a fixed initial spacing. What is often required in practice is to be able to adjust the individual welding heads in position independently of each other, so as to obtain an irregular spacing between the individual longitudinal wires. For example it is often desired to space the longitudinal wires closer together near the side edges of the wire mesh.

To overcome this difficulty, according to this invention, in a wire mesh welding machine having a row of welding heads which are movable laterally to adjust the spacing of the longitudinal wires in the mesh produced by the machine, the heads are individually movable by a conveying device which acts transversely to the direction of advance of the longitudinal wires through the machine, the welding heads having means by which they can be selectively coupled to the conveying device and means for individually controlling the coupling means of each head to enable the distance by which the heads are moved by the conveying device, and hence the lateral spacing of the heads and of the longitudinal wires, to be varied.

The coupling means by which each welding head is coupled to the conveying device can be controlled manually, the operator visually limiting the movement of the welding head. Preferably however the coupling means are controlled automatically. The distance travelled by each welding head is monitored continuously by an automatic controller, which automatically disengages the coupling means as soon as the welding head has travelled the required distance. The movements of the welding heads can be controlled by a programmed computer. For example in the manufacture of welded wire mesh mats for reinforcing concrete, information on the mechanical properties desired in the batch of mats which the machine is about to make is first of all fed to the computer. The computer calculates the best dimensions for the mats and delivers the necessary signals to the machine. In particular, in connection with the present problem, the computer delivers signals for adjusting the machine to give the desired longitudinal wire spacing.

A further consideration is that when making a change from a smaller longitudinal bar spacing to a larger spacing, fewer welding heads are required for the welding. In some cases it is sufficient to disengage the unwanted welding heads, however in many cases it is preferable to remove some of the welding heads from the path of the mesh through the machine, that is to say to shift them out of the way to one side. For this purpose, according to a further feature of the invention, the heads are movable by the conveying device on at least one side of the machine to beyond the side edge of the path of the wire mesh, to allow some of the heads to be parked in inoperative positions when they are not needed for welding a particular length of mesh. Extension guides are also provided, so that unwanted welding heads can be parked at the side, or at the two sides, of the machine.

The conveying device may comprise screw threaded spindles, or an endless chain passing over sprockets, or an endless cable strip or other member extending across the machine, each welding head being provided with a coupling device for coupling the welding head by positive engagement of functionally to the member. There may be two conveying devices for moving the heads one in one direction and the other in the opposite direction. In this way welding heads can be shifted sideways in either direction without any need to reverse the conveying device. This arrangement allows all the welding heads to be adjusted in position with the least loss of time.

An example together with some modification of a mesh welding machine constructed in accordance with the invention is illustrated in the accompanying drawings in which.

Figure 1:
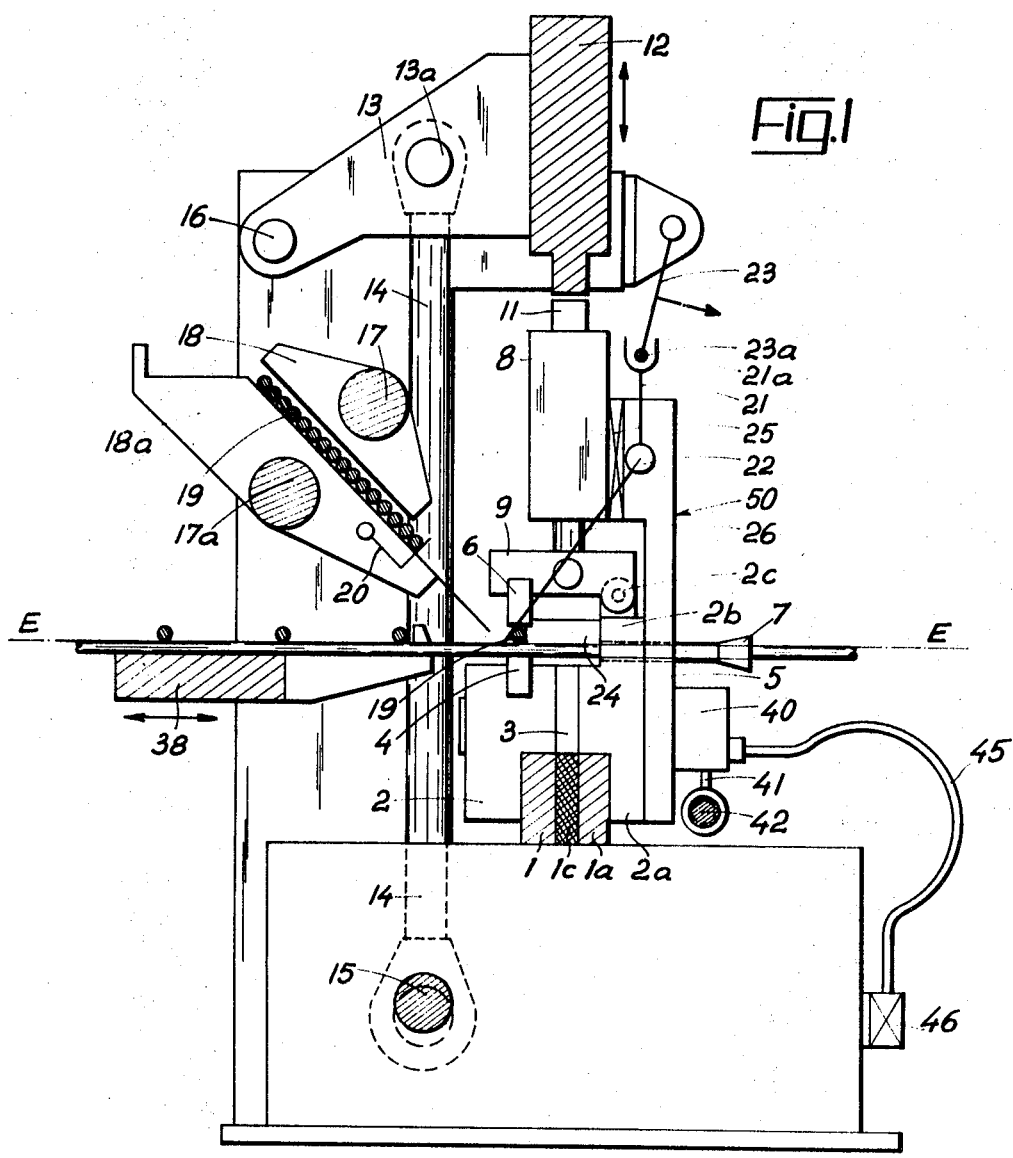
FIG. 1 is a partly sectional side view of the machine.

In this machine a frame supports two electric conductor rails 1 and 1a which are connected to one or more transformers and are electrically insulated from each other by an insulating layer 1c. On the electric conductor rails, a number of welding heads 50, only one of which is visible in FIG. 1, are mounted to slide transversely. Each welding head includes two electric contact shoes 2 and 2a, for picking up current from the two rails 1 and 1a. The two contact shoes 2 and 2a are separate from each other by an insulating layer 3 which, in the present example, also provides the mechanical connection between the two contact shoes 2 and 2a, so as to form a single structural unit 2, 2a, 3.

The first contact shoe 2 directly supports a first electrode 4, which is situated below the plane of the wire mesh E. The second contact shoe 2a is attached, for example by bolts, to a connecting piece 5 which passes through the mesh plane E. The connecting piece 5 is connected by means of a sliding connection 25 to a thrust device 8 containing a spring loaded vertically movable plunger 26. A contact bridge 9 is pivoted to the lower end of the plunger 26. A second electrode 6 is mounted, in line with the first electrode 4, on one end of the contact bridge 9. The unit 2, 2a, 3, the electrode 4, the connecting piece 5, the sliding connection 25, the thrust transmitting device 8, the plunger 26, the contact bridge 9 and the second electrode 6 together constitute a welding head 50. The electrical contact between the second contact shoe 2a and the second electrode 6, which is situated above the mesh plane is provided by an upper projection 2b of the contact shoe 2a. The upper projection 2b passes upwards through the mesh plane and provides, above the mesh plane, a contact surface for the contact bridge 9, which supports the electrode 6. The electrical contact between the parts 2b and 9 can be continuous, or if desired can be closed only during those period when the welding thrust is applied.

Figure 2:
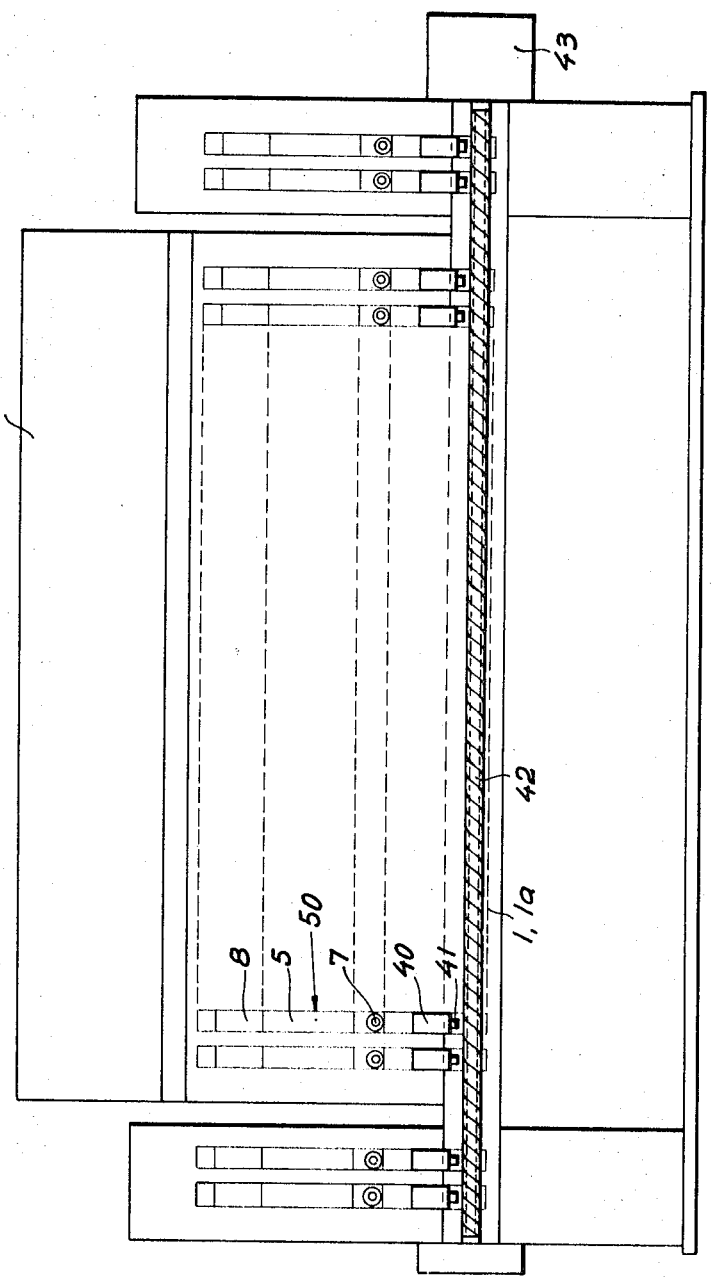
FIG. 2 is a rear elevation of the machine looking in the direction in which the longitudinal wire are fed into it.

In the machine shown in FIGS. 1 and 2, a longitudinal wire guide is provided in the form of a guiding tube 7 attached to the contact shoe 2a and to the connecting piece 5 and directed towards the gap between the two electrodes 4 and 6. Just above the path of the longitudinal wire, each welding head has a mechanical stop 24 for locating a transverse wire correctly in position relative to the electrodes 4 and 6. In FIG. 1 the transverse wires are indicated at 19.

The upper end of each thrust transmission device 8 is provided with a retractable coupling block 11. The coupling blocks 11 allow the individual thrust transmission devices 8 to be engaged and disengaged selectively with an oscillating transverse thrust beam 12, which applies thrust simultaneously to all the engaged thrust transmission devices 8, the thrust beam 12 moving up and down as indicated by the double-headed arrow in FIG. 1. In this example the thrust beam 12 is supported by a lever 13 which is pivoted at 16 to the frame of the machine. A connecting rod 14 pivoted to the lever 13 at 13a is driven by an eccentric 15 and oscillates at the same frequency as an intermittent mesh advancing mechanism and the intermittent operation of the welding heads. The oscillation is transmitted to the lever 13 and to the thrust beam 12. During the downward movement of the thrust beam 12, the upper electrodes 6 of all the thrust transmitting devices 8 which are engaged by engagement of the coupling blocks 11 are thrust against the mesh wires at their crossing points to produce the welding thrust. On the left in FIG. 1 there are two transverse shafts 17 and 17a extending right across the machine. The shafts 17 and 17a support guide plates 18 and 18a between which there is a gap for guiding the transverse wires 19 being fed between the welding electrodes. The gap between the guide plate 18 and 18a and the gap between the electrode 4, 6 together form a feed path for the transverse wires, the feed path ending at the mechanical stop 24.

The transverse shafts 17 and 17a with their guide plates 18 and 18a, together form a feed magazine for the transverse wires. The outlet of the feed magazine is controlled by a gate 20 which opens and closes intermittently, feeding the transverse wires one by one to the welding electrodes. Once a transverse wire has been released by the gate 20, it rolls down on to the longitudinal wires and is then swept into position up against the stop 24 by a sweeper arm pivoted at 22 to the connecting piece 5. The sweeper arm is the longer arm of a two-armed lever 21, the shorter arm of which terminates in a fork 21a. An oscillating rod 23a extending right across the machine engages with all the forks 21a, giving all the two-armed levers 21 an oscillating movement. During each cycle of this oscillation the longer arms of the two armed levers 21 sweep the transverse wire issuing from the gate 20 into position up against the mechanical stops 24.

The transverse rod 23a is attached to the lower ends of oscillating links 23, which are pivoted to the frame of the machine. The oscillating links are driven, by means not shown, at the working frequency of the machine, so that just after each advance of the mesh, but before the welding period, the transverse wire fed through the gate 20 is swept into position up against the mechanical stop 24.

At the outlet end of the machine there are reciprocating hooks 38 as usual and these give the mesh its intermittent, longitudinal advancing movement.

As already mentioned, each welding head 50 can slide transversely along the rails 1 and 1a, for adjusting the longitudinal wire spacing. The machine shown in FIG. 1 is equipped with clamping devices 40, represented only diagrammatically in the drawing, one for each welding head. Each clamping device 40 is for clamping its welding head 50 in position on the rails, 1 and 1a, so that it cannot shift inadvertently during the welding operation. In this example each clamping device 40 is actuated electrohydraulically by means of an electrically controlled valve 46 which admits hydraulic fluid to the clamping device 40 through a pipe 45. To release the clamping device 40 the electric valve 46 is actuated so as to release the hydraulic pressure. A part of the clamping device 40 firmly attached to the welding head 50 contains a coupling pin 41. Under the row of coupling pins 41 of all the welding heads 50, a conveying device extends across the machine. In the example shown in FIGS. 1 and 2 the conveying device is a screw-threaded rotary drive shaft 42.

To engage a particular welding head 50, the coupling pin 41 is advanced to engage with the thread of the rotating drive shaft 42, the screw thread on the drive shaft then propels the welding head along the rails 1 and 1a. Instead of a coupling pin a screw threaded single lever, or a gripping device containing internal threads can of course if desired be used. As soon as the welding head has travelled far enough the coupling pin 41 is disengaged from the shaft 42, and the head is locked in place in its new position by actuating the electric valve 46. The two functions can if desired be performed by the same device. For example the electric valve 46 can actuate a part which engages the coupling pin 41 and at the same time releases the locking device 40, to move the welding head, and subsequently disengages the coupling pin and engages the locking device 40 to lock the welding head in its new position. The electric valves 46 can be controlled manually, the operator visually observing the movement of the welding head. Preferably however the welding heads are adjusted in position by an automatic controller.

Instead of the screw threaded rotary shaft shown in FIGS. 1 and 2 other forms of conveying devices may be used such as an endless chain, cable or strip, each welding head having a coupling device for positive coupling to, or frictional engagement with, the conveying device. In any case a control device is necessary to ensure that each welding head is coupled for the requisite period to the conveying device.

As shown in FIG. 2, the conveying device 42 extends across the machine to beyond the outer edges of the wire mesh, the rail or guide for the welding head also extending in a like manner. This allows welding heads which are not wanted for a particular mesh to be parked in inoperative positions on one side or on both sides of the machine. The unwanted welding heads are conveyed by the conveying device, and their movements are controlled as described above, to bring them into their parking positions.

Figure 3:
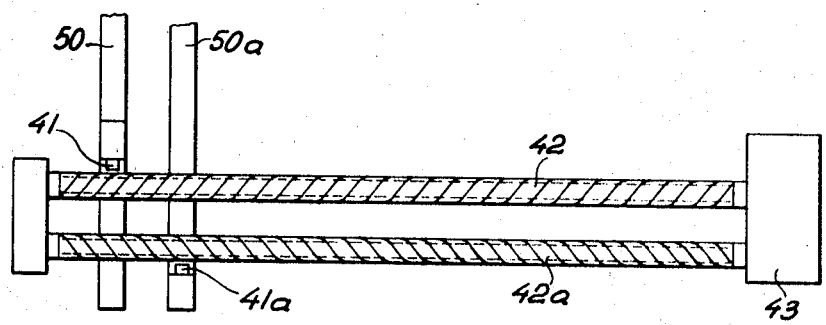
FIGS. 3 to 5 show diagrammatically three forms of conveying device which as alternatives to each other form part of the machine.
Figure 4:
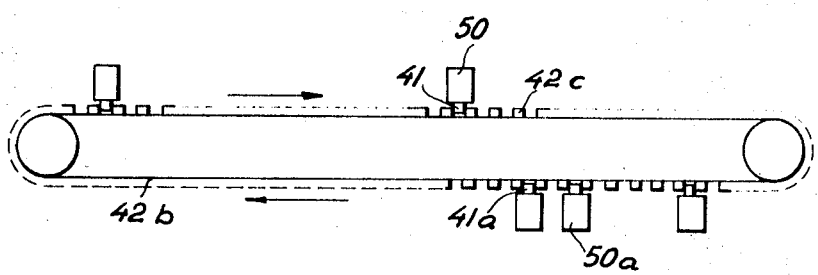

In a preferred example of the invention there are, as shown in FIGS. 3 and 4 two conveying devices which move in opposite directions. Each welding head can be coupled selectively to either of the conveying devices, for conveying it in one direction or the other. FIG. 3 shows two screw threaded rotary shafts 42 and 42a. The two shafts can either be driven to rotate in the same sense and have threads of opposite hands, or they can both be threaded in the same direction but be rotated in opposite senses. The two rotary shafts are driven from one end and are coupled together by gearing at the other end.

FIG. 4 shows an endless belt 42b equipped with bars 42c between which the coupling pins 41 and 41a of the welding heads 50 and 50a engage. Each coupling head can be engaged selectively with either section of the belt for conveyance in either of the two directions.

The examples shown in FIGS. 3 and 4 may be arranged so that half of the total number of welding heads can be engaged with one of the two conveying devices (with the rotary shaft 42 or with one-half of the endless belt 42b), while the other half of the welding heads engage with the second conveying device (the rotary shaft 42a or the other part of the endless belt). This allows each welding head to be conveyed over the entire length of the conveying device. In the example shown in FIG. 5 there is a single rotary shaft 42c, the two halves of the shaft having oppositely handed threads. With this arrangement each welding head can be conveyed across only one-half of the width of the welding machine.

Figure 5:
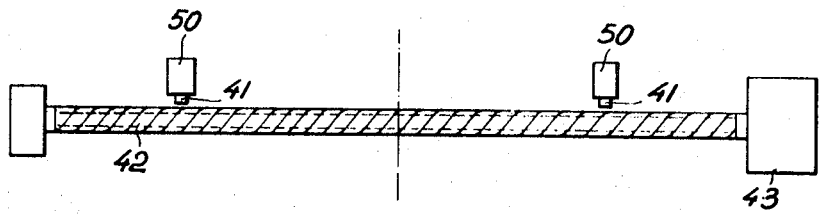

If the examples of FIGS. 3 and 4 are arranged in this way, and also with the example of FIG. 5, the conveying devices must be reversible so that each welding head can be conveyed selectively in either direction.

Figure 6:
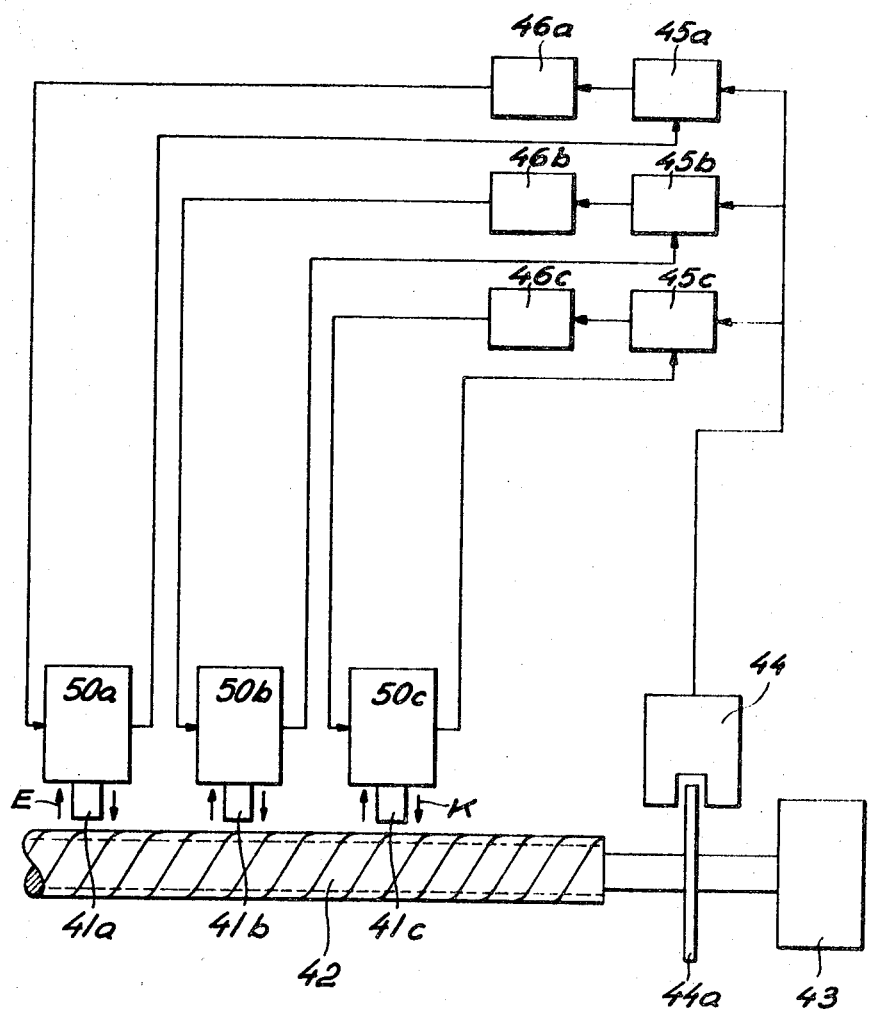
FIG. 6 shows diagrammatically another part of the machine.

As already mentioned the control of the coupling between each welding head and the conveying device is preferably effected automatically, so that the distance of travel of each welding head is established automatically. FIG. 6 shows diagrammatically a simple arrangement for providing automatic control.

The rotating conveyor shaft 42 is driven by a motor and gear box 43, and on the shaft 42 there is a pulse emitting disc 44a, which can for example be an optical device, such a perforated disc, cooperating with a photocell, or a magnetic device acting by induction. When the screw threaded shaft 42 rotates the emitting disc delivers pulses to a sensor 44, the number of pulses delivered being proportional to the angle of rotation of the shaft 44.

The pulses picked up by the sensor 44 are fed to the input terminals of a number of AND gates 45a, 45b, 45c, one for each of the welding heads 50a, 50b, 50c. As soon as one of the coupling pins 41a or 41b or 41c engages with the threaded shaft 42, by advancing in the direction of an arrow K in FIG. 6, an opening voltage is applied to the other input terminal of the relevant AND gate. The engaging movement of the coupling pin can be utilized for closing a switch in the opening circuit. Connected to the output terminals of the AND gates there are pulse counters 46a, 46b, 46c which can be preset. Each pulse counter can be set to respond to a particular number of pulses, corresponding to a particular distance of travel of the welding head. As soon as the welding head has travelled this distance sending out the corresponding number of pulses, the relevant counter responds by returning, by a reset action, to its initial position, and then closes an electric circuit which disengages the coupling pin 41a or 41b or 41c so as to disengage the particular welding head from the rotary shaft 42, the coupling pin moving in the direction of an E in FIG. 6.

Although FIG. 6 shows only three welding heads 50a, 50b, 50c, with their control circuits, in practice there are of course many more welding heads than this. To readjust the longitudinal wire spacing the desired conveying distances for the individual welding heads are set on the counters 46a, 46b, 46c whereupon the threaded shaft 42 is set in rotation. The arrangement allows all the welding heads to be conveyed at the same time towards their desired new positions.

Measurement of the conveying distances can of course be effected in other ways, for example by an analogue method. Other arrangements may also of course be used for actuating the coupling pin or other coupling device of each welding head. As already mentioned, the period of coupling between each welding head and the conveying device can if desired be controlled on the basis of a preset program, if necessary by a computer.

We claim:

1. In a wire mesh welding machine for making welded wire mesh including longitudinal wires and transverse wires welded to each other at their crossing points, said machine including means for feeding said longitudinal wires through said machine, means for feeding said transverse wires into said machine into a position in which each wire extends across said longitudinal wires, at least one row of welding heads for welding said transverse wires to said longitudinal wires at said crossing points and means mounting said welding heads for lateral movement across the direction of feeding of said longitudinal wires, the improvement comprising a conveying device for producing lateral movement across said direction of feed of said longitudinal wires, means for driving said conveying device, coupling means for each of said welding heads for coupling said welding heads to said conveying device for movement therewith or uncoupling said welding heads therefrom, and means for individually controlling said coupling means to enable said welding heads to be selectively coupled to said conveying device whereby the distances by which said heads are moved by said device and hence the lateral spacing of said heads and of said longitudinal wires may be varied.

2. A wire mesh welding machine as claimed in claim 1, wherein said means mounting said welding heads permits movement of said heads laterally beyond at least one side of said longitudinal wires fed into said machine by said feeding means and said conveying device is operative to move at least some of said heads into said position beyond said at least one side, whereby said laterally moved heads are parked in inoperative positions for welding mesh with a reduced number of longitudinal wires.

3. A wire mesh welding machine as claimed in claim 1, wherein said conveying device includes a shaft, a screw thread on aid shaft and means rotatably mounting said shaft extending across said machine along said row of welding heads and each of said coupling means includes screw thread engaging means and means for moving said screw thread engaging means between an inoperative position in engagement with said screw thread whereby said screw thread moves said engaging means laterally upon rotation of said shaft and means operatively connecting said screw thread engaging means to said welding head to move said welding head with said screw thread engaging means.

4. A wire mesh welding machine as claimed in claim 1, wherein said conveying device includes an endless flexible element, means mounting said endless flexible element with two runs of said element extending across said machine along said row of welding heads and means for continuously moving along said endless element, and said coupling means for each of said welding heads includes means for disengageably coupling said head to one of said two runs of said flexible element.

5. A wire mesh welding machine as claimed in claim 1, wherein said conveying device includes two conveying means, one of said conveying means being operative to move said heads in one direction and the other of said conveying means being operative to move said heads in an opposite direction and said coupling means being operative to couple said heads selectively to either said one or said other conveying means.

6. A wire mesh welding machine as claimed in claim 1, wherein said conveying device includes two conveying means and said coupling means of some of said welding heads being operative to couple said heads to one of said two conveying means and said coupling means of the remainder of said welding heads being operative to couple said remainder of said welding heads to the other of said conveying means.

7. A wire mesh welding machine as claimed in claim 6, wherein said two conveying means comprise a shaft, means rotatably mounting said shaft extending across said machine along said row of welding heads, a screw thread extending along said shaft from one end thereof to a point intermediate the ends thereof and a second oppositely handed screw thread extending along said shaft from the other end thereof to said intermediate point.

8. A wire mesh welding machine as claimed in claim 4, wherein said coupling means of each of said welding heads are operative to couple said heads selectively to said two runs of said endless flexible element.

9. A machine as claimed in claim 1, further comprising measuring means associated with each of said welding heads, said measuring means being operative to measure the distance which said head is moved by said conveying device and means operatively connecting said measuring means to said coupling means whereby said coupling means is operated to uncouple said welding head from said conveying device when said welding head has been moved by said conveying device through a predetermined distance.

10. A wire mesh welding machine as claimed in claim 1, further comprising program controller means and means operatively connecting said program controller means to all of said coupling means for operating said coupling means to couple said welding heads to said conveying device and uncouple said welding heads therefrom.